Figure 1:
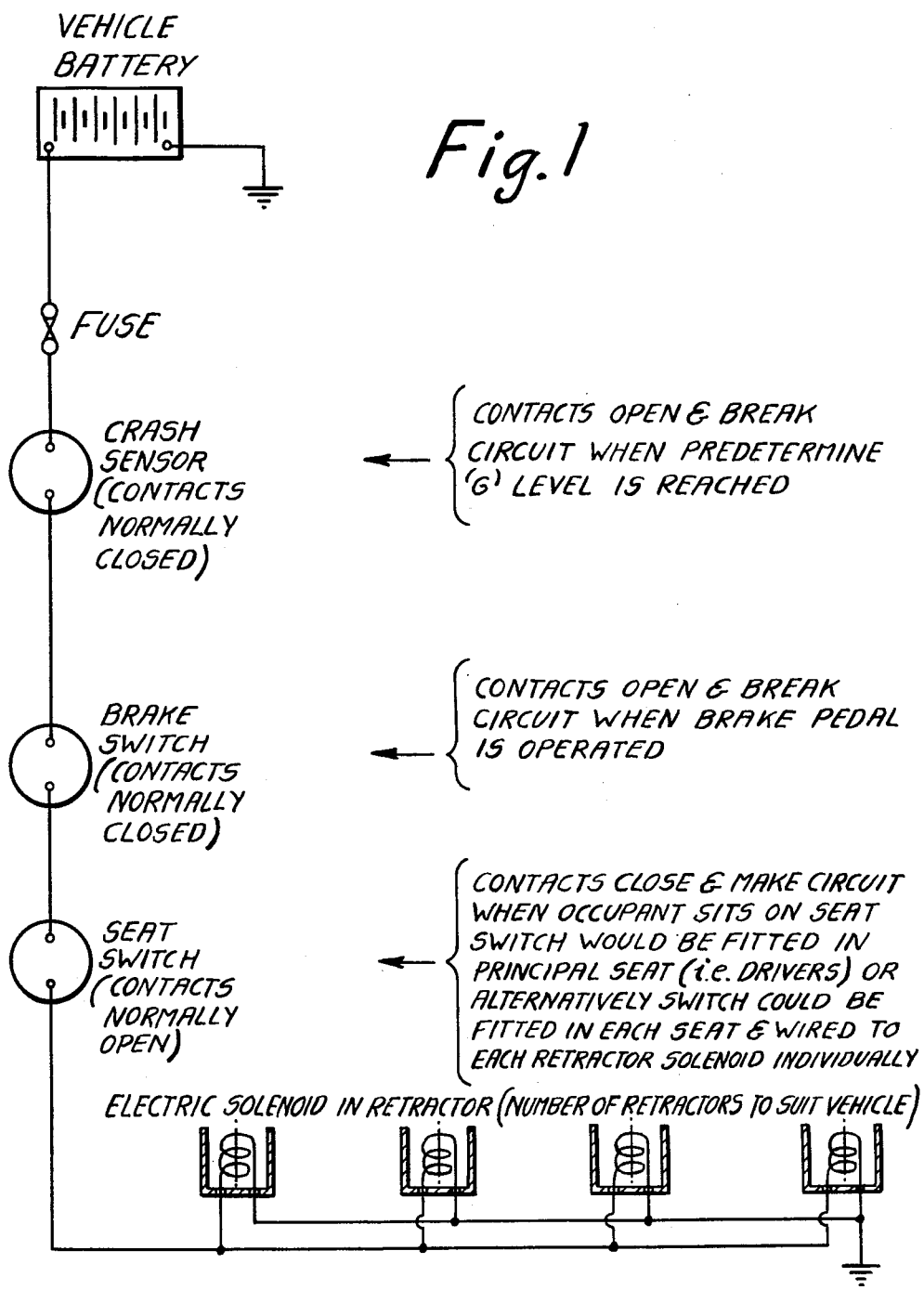

United States Patent

Ashworth et al.

[11] 4,103,754
[45] Aug. 1, 1978

[54] PROTECTION OF OCCUPANTS OF A VEHICLE

[75] Inventors: Roger Anderton Ashworth, Carlisle; John Michael Pollitt, Gretna; Graham Colin White, Bellinge, all of England

[73] Assignee: Kangol Magnet Limited, London, England

[21] Appl. No.: 722,263

[22] Filed: Sep. 10, 1976

[30] Foreign Application Priority Data

Sep. 10, 1975 [GB] United Kingdom .............. 37268/75

[51] Int. Cl.$^2$ ............................................. B60R 21/10
[52] U.S. Cl. ................... 180/82 C; 180/101; 180/103 A; 242/107.4 R
[58] Field of Search ............. 180/82 C; 242/107.4 R, 242/107.4 A, 107.4 B; 307/105 B; 200/61.5 B; 340/52

[56] References Cited

U.S. PATENT DOCUMENTS

| | | | |
|---|---|---|---|
| 3,713,506 | 1/1973 | Lipschutz | 242/107.4 R X |
| 3,880,380 | 4/1975 | Sugiura | 242/107.4 R |
| 3,905,440 | 9/1975 | Okada | 180/82 C |
| 3,905,562 | 4/1975 | Kell | 242/107.4 B X |
| 3,952,966 | 4/1976 | Burleigh | 242/107.4 R |

Primary Examiner—Joseph F. Peters, Jr.
Assistant Examiner—Terrance L. Siemens
Attorney, Agent, or Firm—Young & Thompson

[57] ABSTRACT

An inertial device is provided for location in a road vehicle independently of a seat belt retractor, and is arranged to actuate the locking mechanism of the retractor in response to a predetermined acceleration. The device may be operable in response to application of the vehicle brakes. The device may be associated with more than one seat belt and may be held electrically against a spring bias in the locked position, for release on sensing the predetermined acceleration.

2 Claims, 3 Drawing Figures

PROTECTION OF OCCUPANTS OF A VEHICLE

The invention relates to the protection of occupants of a vehicle, in particular a road vehicle, in the event of a sudden deceleration, as may occur during a crash or other emergency.

Conventionally, seat belts for this purpose are withdrawn for use from so-called inertia reels which are fixedly secured to the vehicle and each of which includes an inertia sensing device, usually a pendulum which is arranged to tilt, in response to an acceleration above a predetermined amount sufficiently to effect locking of the reel against withdrawal of the belt. The inertia reel has therefore to be very precisely oriented in the vehicle so that the pendulum normally hangs vertically.

According to the invention, a condition sensitive device is located in a vehicle independently of a seat belt retractor with an emergency locking mechanism, the device being capable of actuating the locking mechanism, as by the transmission of an electric signal, on the sensing of a predetermined condition. The condition sensitive device is usually an inertial device responsive to a predetermined acceleration (including deceleration) of the vehicle, but a device responsive to the application of a road vehicle brakes may be used as well or instead, because the driver can be expected to attempt to stop the vehicle in the circumstances in which it is intended that the retractor be locked. Usually the vehicle will be fitted with several retractors all of which will be electrically connected with the condition sensing device. Typically therefore the invention will be embodied in a system for the protection of the occupants of a vehicle, the system comprising a seat belt and retractor for each occupant, an inertia switch arranged to be mounted on the vehicle independently of the retractors, the inertia switch being electrically connected with the retractors and operative to lock them against withdrawl of the associated belt in response to a predetermined acceleration. The independent mounting of the inertia switch or other condition sensing device and the retractor or retractors permits the latter to be located in the vehicle in any convenient position and without regard to any particular orientation, and the system requires only a single inertia device regardless of the number of retractors included in it.

The invention also provides a seat belt retractor suitable for use in the system, the retractor comprising a store means from which the seat belt may be withdrawn for use, means for returning the belt to the store means, and a locking mechanism responsive to an electric signal to prevent withdrawl of the belt. The locking mechanism is preferably spring biassed to the locked position and normally held against the bias electrically; the locking signal is then an interruption of the electric supply by which the mechanism is held against the bias.

Figure 2:
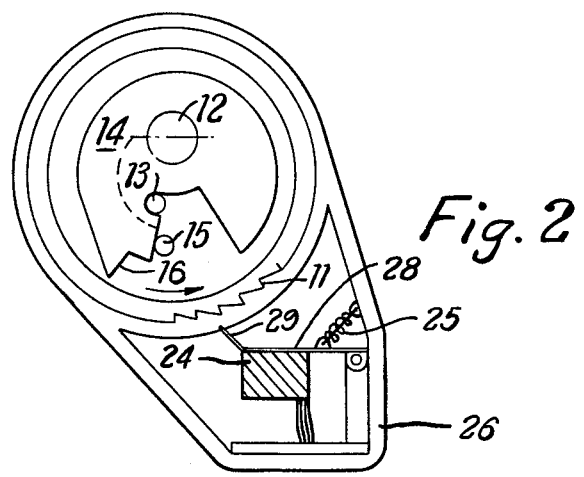
Figure 3:
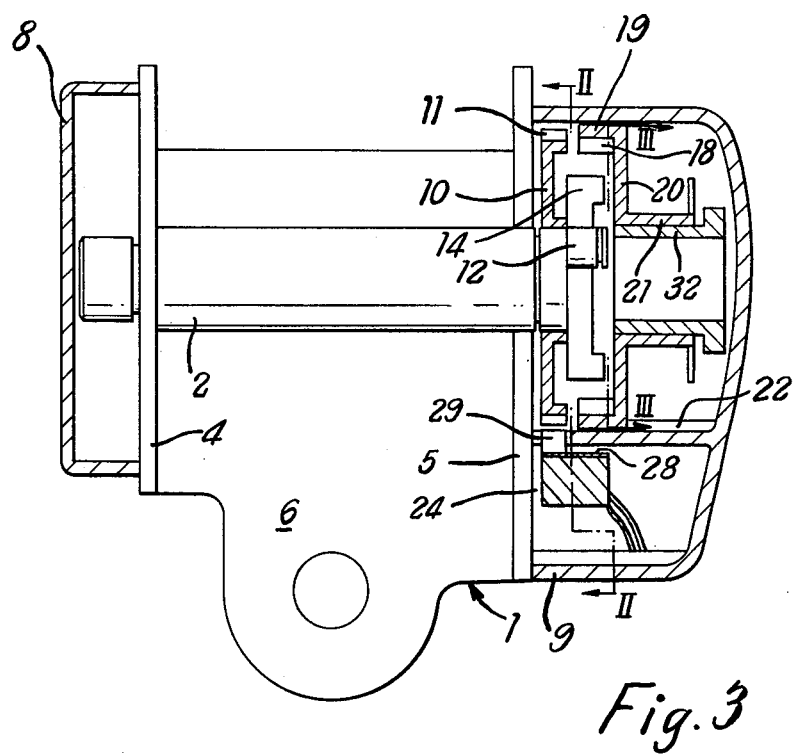

The invention will be readily understood from the following illustrative description and drawings, in which:

FIG. 1 is a schematic circuit diagram of a system embodying the invention, for use in a road vehicle; and FIGS. 2 and 3 are orthogonal cross-sectional views of a strap sensitive locking mechanism for use in the present invention.

In FIG. 1, the circuit includes four parallel connected solenoid coils each incorporated in a respective seat belt retractor associated with a seat in the vehicle.

The group of parallel connected solenoid coils is connected in series with an electric current source, conveniently the vehicle battery, a fuse, and a crash sensor, that is, a sensor responsive to a condition in which it is desired that the retractors lock against belt withdrawal, so that the users are restrained against ejection from their seats. Also connected in series with these circuit elements are a brake switch, operated when the driver of the vehicle depresses the brake pedal, and a seat switch, the operation of which is dependent on the occupancy of the driver's seat.

The seat belt retractors preferably each comprise a spindle from which a length of safety belt or strap can be unwound for use against the tension of a rewind spring. The length of strap which is stored may be the diagonal portion of a lap and diagonal seat belt system but the retractor can be associated with a seat belt system of any kind. The retractor also can take a variety of forms. It is preferred however that the retractor be strap sensitive, that is, arranged also to lock in response to a sharp pull on the belt such as will be experienced when the user is thrown forward in his seat as a result of a sudden deceleration of the vehicle. A suitable strap sensitive locking mechanism is described In U.S. Pat. No. 3,905,562 and shown in FIGS. 2 and 3.

In FIGS. 2 and 3, a flywheel 10 is shown freely journalled on the main shaft of the retractor and a recessed pawl 14 provided with a tooth 16 is freely journalled on an eccentric stub shaft 12. A spring (not shown) holds the pawl 14 in a normal position engaging pins 13, 15 projecting from the the flywheel 10.

If the belt wound on the shaft 2 is sharply accelerated, by being pulled out at more than a certain speed, the shaft will rotate quickly but the inertia of the flywheel 10 causes this to lag, and the pin 15 will quickly engage on the side of the recess in the pawl 14 adjacent the tooth portion 16 so holding the pawl back. Because of the eccentric mounting of the pawl 14, the effect will be to cause the tooth 16 to move outwardly, to a position in which it will engage with ratchet teeth 18 on an annulus 19 secured in the retractor either directly or through an energy, absorbing mechanism. This immediately prevents further withdrawal of the belt.

The retractor also includes a solenoid 24 of which the armature is a pivoted lever 28 having an inclined tip 29 at its free end. The lever is held in the position shown in FIG. 2 by energization of the solenoid and on de-energization of the solenoid is urged by a spring 25 to a position in which the tip 29 engages teeth 11 at the periphery of the flywheel 10. The flywheel is thus held against rotation with the shaft 2 in the belt unwinding direction and even a slight further pull on the belt will effect locking as previously described.

The retractor can of course have other forms than as described, and if strap sensitive locking is not required the solenoid can for example act directly on a locking bar engageable with one or more ratchet wheels fixed on the main shaft.

The crash sensor of the circuit is an inertial switch of any suitable design but preferably one which is responsive to deceleration in any direction of the vehicle to which it is secured, as opposed to one which is sensitive only to acceleration in the direction of movement of the vehicle. The safety system of the invention is thus effective for example if side of the vehicle is struck by another. For the present circuit, the contacts of the crash sensor are normally closed and open only when an emergency deceleration is sensed.

The crash sensor may comprise for example a ball resting within a circular depression in a support surface. The ball normally occupies the central lowest portion of the depression where its weight is sufficient to depress the actuating element of a micro-switch against a spring and thereby hold the micro-switch contacts closed. A sufficient acceleration will cause the ball to roll upwardly within the depression and so free the actuating element for spring urged movement to open the contacts.

The brake switch included in the circuit also has its contacts normally closed and arranged to open only when the vehicle brake pedal is depressed. The brake switch may be operative only when the pedal is fully depressed but no disadvantage is incurred if even a light pressure on the pedal opens the contacts.

As the driver will normally apply the brake in any emergency situation, the brake switch thus ensures that the circuit is broken even if the crash sensor should fail.

The crash sensor and brake switch thus each serve to cut off current supply to the solenoids on operation, the former when the vehicle experiences a deceleration however caused and the latter when a deceleration is intended for whatever reason. The seat switch included in the driver's seat of course serves a different function and its contacts are normally open.

In use, the circuit is energized at the start of a journey by operation of the ignition switch and by closure of the seat switch. The crash sensor and brake switch, if included, will be closed, so that the locking mechanisms of the retractors, or of each retractor associated with an occupied seat, are held inoperative by energization of the associated solenoid. The seat belt systems can thus be fitted by the users without hindrance. The vehicle is then operated and normally, the occupants will be free to make movements which require withdrawal of extra lengths of belt from the retractors. When the vehicle is braked or in the event of sudden deceleration, the circuit will be broken and the retractors wil be locked, so that the driver and any passengers are safely held in their seats until normal conditions return.

The invention can thus be seen to offer a reliable system for the protection of the occupants of a vehicle which is simple and inexpensive both in terms of the equipment employed and the labour required for installation. The electric circuitry employed makes it easy to integrate the system with arrangements for warning that seat belts are not being used. The invention can of course be embodied in various ways other than as specifically described.

We claim:

1. A system for protection of occupants of a vehicle having braking means, a driver's seat, and at least one passenger seat, said system comprising:
   a plurality of seat belt means each associated with a respective seat and each comprising a seat belt, a seat belt retractor from which the seat belt can be withdrawn for use by the occupant of the seat, lock means operable to prevent withdrawal of the belt from the retractor, biasing means urging said lock means to the operative condition, and solenoid means responsive to the supply thereto of an electric power supply to hold said lock means inoperable against said biasing means,
   means connecting said plurality of solenoid means in parallel,
   first switch means having switch contacts, means responsive to vehicle deceleration to cause circuit breaking opening of said contacts, and means holding said contacts closed in the absence of said deceleration,
   second switch means having switch contacts, means responsive to operation of said vehicle braking means to cause circuit breaking opening of the last-named contacts, and means holding the last-named contacts closed in the absence of said braking means operation,
   third switch means having switch contacts, means responsive to occupation of said driver's seat to close the last-named contacts, and means holding the last-named contacts open when said driver's seat is unoccupied,
   electrical power supply means,
   and means connecting said first, second and third switch means in series with said parallel-connected solenoid means.

2. The system of claim 1 wherein each of said lock means further comprises means operable to prevent withdrawal of said belt in response to initial withdrawal thereof at a speed greater than a predetermined speed.

* * * * *